UNITED STATES PATENT OFFICE

2,327,066
PRODUCTION OF OXYGENATED CARBON COMPOUNDS

Otto Roelen, Oberhausen-Holten, Germany; vested in the Alien Property Custodian

No Drawing. Application April 15, 1939, Serial No. 268,024. In Germany September 19, 1938

8 Claims. (Cl. 260—598)

My invention relates to the production of oxygenated carbon compounds and more particularly to the production of valuable carbonyl compounds, such as aldehydes and ketones, and hydroxy compounds, such as alcohols.

It is an object of my invention to produce such oxygenated substances from organic compounds which contain olefinic double bonds by acting thereon with carbon monoxide and hydrogen.

Other objects of the invention will appear as the specification proceeds.

I have found that carbon compounds which contain olefinic double bonds can be converted into carbonyl compounds by an addition of carbonyl groups =C=O. To this end I act with carbon monoxide and, hydrogen in the presence of a suitable catalyst on unsaturated carbon compounds preferably under increased pressure of at least 20 atmospheres and at moderately elevated temperatures of for instance 50 to 200° C. Aldehydes and ketones are mainly formed according to the following fundamental equations:

(1) 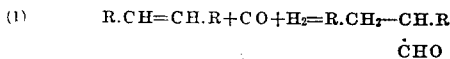

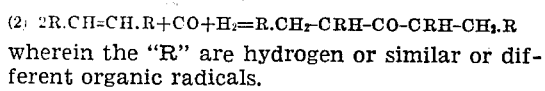

wherein the "R" are hydrogen or similar or different organic radicals.

If sufficiently high pressures of at least about 50 atmospheres are employed, the reaction proceeds with practical yields already at temperatures as low as for instance 50–100° C. at which the carbon monoxide is not yet appreciably decomposed by reduction, so that the carbonyl group is maintained in the condensation reaction and mainly carbonyl compounds, such as aldehydes and ketones, or derivatives of these carbonyl compounds, which may form under the operating conditions, are produced, while methane is not formed in objectionable quantities.

If lower pressures are employed, the temperature must be chosen the higher, whereby however part of the carbon monoxide is decomposed by reduction under the formation of hydrocarbons and water and/or carbon dioxide. Another part of the carbon monoxide is again caused to condense with the unsaturated organic starting compounds, so that the reaction product consists of hydrocarbons, oxygen derivatives of hydrocarbons and water, if for instance pressures of about 1 to 10 atmospheres and, correspondingly, temperatures of about 180° C. are employed. These oxygen derivatives of hydrocarbons generally comprise carbonyl compounds and hydroxy compounds in proportions which depend on the catalysts and the operating conditions employed.

I may employ as unsaturated starting carbon compounds in the first line gaseous, liquid or solid olefin hydrocarbons, such as ethylene, propylene or butylene, or the higher and even the highest known homologs of this series. I may further employ cyclo-olefines or unsaturated naphthenes or mixed aliphatic hydrocarbons, i. e. aliphatic hydrocarbons, which contain aromatic radicals, for instance styrol, $C_6H_5 \cdot CH=CH_2$, or hydrocarbons of the terpene series, such as limonene or pinene, or products of substitution of these unsaturated hydrocarbons, for instance unsaturated alcohols, aldehydes, ketones, acids or halogen derivatives, which by condensation with carbon monoxide are converted, respectively, into keto alcohols or oxy aldehydes or di-ketones or keto-aldehydes or di-aldehydes or di-ketones or aldehydic acids or ketonic acids or halo-aldehydes, -ketones or -acids.

Gases which contain carbon monoxide in addition to other gases can be employed instead of pure carbon monoxide. I prefer to use gases which contain carbon monoxide and hydrogen, such as water gas, but I may also use mixtures which are richer or poorer in carbon monoxide in relation to hydrogen than water gas.

The condensation of carbon monoxide with the unsaturated carbon compounds is preferably carried out in the presence of hydrogenating catalysts. The metals of the eighth group of the periodic system of elements, especially iron, cobalt and nickel, have proven particularly suitable, and their catalytic efficacy can be increased by the addition of activators such as the oxides and hydroxides of alkali metals, chromium, manganese, aluminium, thorium or magnesium. The catalysts may be employed in solid form and for instance in finely divided state arranged on carriers, such as kieselguhr, and the compounds to be reacted are in this case passed over the catalysts in form of gases or vapors. It is however also possible to apply the catalysts in liquid phase and to suspend the catalyst for instance in an inert liquor, such as saturated paraffin or benzene, or in the liquid unsaturated carbon compounds to be reacted and to contact under increased pressure the gas or gas mixture, which contains the carbon monoxide, with this suspension of the catalyst.

For each catalyst there exists a certain limit of temperature such that under a predetermined pressure mainly or exclusively carbonyl compounds are formed below said critical temperature, while under the same pressure the formation of alcohols starts becoming remarkable at said temperature limit and increases with increasing temperature. The temperature limit depends also on the excess of hydrogen present and on the time of reaction, and on the nature of the specific unsaturated compound treated.

The temperature limit lies in the range of 100–140° C. for a catalyst comprising finely divided cobalt. Mainly or exclusively carbonyl compounds are produced with this catalyst from ethylene, propylene or the higher homologs which boil for instance between 40 and 200° C. or the still higher boiling olefinic hydrocarbons contained in Diesel oil or from similar compounds, if temperatures below 100–120° C. are used, while above 120–140° C. the corresponding alcohols are formed in increasing quantities.

The yield of oxygenated carbon compounds is relatively low under low pressures, and increases with higher pressures at the same temperature. The reaction participants are converted in larger quantities even under low pressure, if the temperature is raised. Higher temperatures however cause increasing quantities of the hydrogenated products of the olefines, of the carbonyl compounds and finally of the carbon monoxide to be simultaneously formed. Saturated hydrocarbons are thus formed from the olefines, alcohols from the carbonyl compounds and, at still higher temperatures, hydrocarbons from carbon monoxide. The temperature is therefore chosen according to the products which shall be produced in each particular case. Temperatures are avoided which are so high that the desired products are already decomposed or that the olefinic starting materials or even the carbon monoxide are decomposed under the formation of carbon or hydrocarbons and are thus prevented from reacting with each other according to the reactions mentioned above. If particularly active catalysts are used, good yields of carbonyl and/or hydroxy compounds are obtained, even if relatively low pressures and temperatures are employed. As a rule I do not operate below about 40° C., at low temperatures I employ pressures of more than 100 and even 300 atmospheres whenever the reaction gases or vapors are passed over the catalysts. If the reactants are however enclosed in an autoclave, pressures of about 20 atmospheres may be sufficient even if the low temperatures mentioned above are used, since copious quantities of the oxygenated compounds are formed after the lapse of for instance 10–20 hours. If the gas to be reacted is passed over particularly efficient catalysts, moderately increased pressures of about 40 atmospheres are sufficient at a temperature of about 40° C. The yield may be considerably increased by correspondingly higher pressures.

The yield will be the higher, as a rule, the longer the time of reaction, i. e. the time during which the reactants are contacted under the operating conditions with the catalysts. If the reactants are maintained in contact with the catalysts during a time which is very extended with regard to the temperature and pressure employed, secondary reactions may occur, and the aldehydes primarily formed might for instance be caused to condense.

I have found it advantageous under certain conditions to quickly withdraw the primary products of reaction, if the reactants are passed in form of gases or vapors over the catalyst. In this manner I am enabled to increase the time of reaction, i. e. the time during which the reactants are contacted with the catalysts, while the primary products are not exposed to the catalysts and the high temperature and pressure conditions during so long a time that they could be converted into undesired substances. I succeed therein by recycling the reaction gas and by withdrawing the primary products of reaction each time before the gas is once more contacted with the catalysts.

In view of the very different compounds which may be used as starting materials for the conversion into oxygenated carbon compounds, and in view of the wide ranges of temperatures and pressures which may be employed with these different compounds and with the different catalysts to be employed, the time of reaction may vary within wide limits, for instance between a few seconds and several hours. However by reasonable application of the teachings of this specification everybody skilled in the art will be able to choose the best conditions of operation for every starting material.

I may thus for instance produce propylic aldehyde and normal propyl alcohol from ethylene; normal and iso butylic aldehyde and normal and iso butylic alcohol from propylene; 2 methyl valeric aldehyde, 2 ethyl butyric aldehyde, 2 methyl valeric alcohol and 2 ethyl butyric alcohol from 2-pentene H$_3$C—CH=CH—CH$_2$—CH$_3$. I may further react carbon monoxide and hydrogen, in the presence of hydrogenating catalysts, with substances such as allyl-alcohol, geraniol, acrylic aldehyde, crotonic alcohol and crotonic aldehyde, methyl heptenone (CH$_3$)$_2$C=CH—CH$_2$—CH$_2$—COCH$_3$ mesityl oxide (CH$_3$)$_2$C=CH—COCH$_3$, phorone CH$_3$—C=CH—CO—CH=C(CH$_3$)$_2$, ionone, styrol, cinnamic aldehyde and cinnamic alcohol, stilben C$_6$H$_5$·CH=CH·C$_6$H$_5$ or eugenol.

The oxygenated components produced according to my invention are highly valuable. The carbonyl compounds serve mainly for further conversions and for instance for the production of fatty acids. The alcohols are suitable as wetting agents or as solvents for instance for lacquers.

*Example 1.*—Through a reaction tube filled with a cobalt-thorium catalyst, which is composed of 100 parts cobalt, 15 parts thorium and 200 parts kieselguhr and of which 400 to 500 grams are arranged in one liter, there is passed at a temperature of 90–100° C. and under a pressure of 100 atmospheres a mixture containing ethylene, carbon monoxide and hydrogen in a ratio ranging between 1:1:1 and 2:1:1. The heat of reaction formed is allowed to escape, so that the operating temperature is maintained with an accuracy of about 1–2° C. To this end the reaction tube may be arranged for instance in a water bath or oil bath. If 100 normal liters of the gas mixture, i. e. the quantity which at room temperature and atmospheric pressure occupies 100 liters, are passed hourly through one liter of the catalyst space, 300–400 grams liquid products are obtained from 1000 normal liters of the starting gas mixture. No gaseous secondary products are formed in noticeable quantities. Since therefore only inert gases, such as nitrogen, if present, are enriched in the final gas, this final gas can be used for another condensation reaction, after concentration and the relative proportions of the three reaction participants have first been corrected if necessary. The gas may also be led through the reaction room and through devices for separating the oxygenated compounds in continuous cycle, and the yield can be increased further in this manner, for instance up to 700 grams of liquid products per 1,000 normal liters. The liquid products obtained can be separated from each other by a simple fractionating operation yielding

| | Per cent |
|---|---|
| Propionic aldehyde | 40 |
| Diethyl ketone | 20 |
| Higher boiling aldehydes and ketones or other oxygenated compounds | 40 |

*Example 2.*—A reduced cobalt thorium kieselguhr catalyst is suspended in an oil of turpentine, 90% by volume of which boil below 170° C., in the proportion of 10-20 grams of the catalyst per liter of the oil. This suspension is exposed to the action of water gas, which contains 50% by volume $H_2$, 45% CO and 5% $N_2+CO_2$, under a pressure of up to about 200 atmospheres above normal. The mixture is thoroughly stirred at temperatures of 120-140° C. during three hours. The oil of turpentine absorbs during this treatment 135 normal liters carbon monoxide and about the same amount of hydrogen per kilogram oil, while the specific weight rises from 0.863 to 0.942. The product of reaction contains 7.3% oxygen and shows all reaction characteristic of aldehydes. It can for instance simply be reacted with sodium bisulfite. The reaction product appears to contain an aldehyde deriving from pinene.

*Example 3.*—In the manner described in Example 2 I can also treat, instead of the oil of turpentine, a synthetic lubricating oil obtained by a condensation of olefines under the action of aluminium chloride and having an iodine value of 87 and a specific weight of 0.852. 1 kg. of this lubricating oil, if exposed during about 3 hours to a temperature of 120° C. and a pressure of 125 atmospheres, absorbs 20 normal liters CO and approximately the same quantity of $H_2$. The specific weight rises to 0.860 and the viscous mass contains aldehydic compounds, which according to my experiments can be reduced by hydrogen to highly viscous alcohols.

The oxygenated compounds obtained for instance according to Examples 1-3 can subsequently be reduced to the corresponding alcohols. This reduction may be carried out in the same reaction vessel and with the same catalysts, for instance by a change of the temperature or of the hydrogen concentration or of the pressure. The reduction may, however, also be carried out with some other reducing catalysts and in different reaction vessels.

According to my invention primary and secondary alcohols can however also be obtained directly from the unsaturated carbon compounds mentioned above under the action of carbon monoxide, as illustrated in the following example.

*Example 4.*—A mixture of ethylene, carbon monoxide and hydrogen in a proportion ranging between 1:1:1 and 1:1:2 is passed under a pressure of 100 atmospheres and at a temperature of 200° C. at the rate of 100 normal liters of the gas mixture per hour through one liter of a catalytic chamber which is filled with 800–1,000 grams per liter of a cobalt catalyst produced by impregnating pumice stone of a mean particle size of 1 to 3 mms. with the nitrates of cobalt, copper and thorium in the proportion of approximately 100 parts CO, 3 parts Cu and 18 parts $ThO_2$ and subsequently roasting and reducing these nitrates. 250 grams of liquid products are obtained per 1,000 normal liters of the gas mixture passed through the catalytic chamber and 70% of these liquid products consist of normal propyl alcohol.

Various changes may be made in the details disclosed in the foregoing specification without departing from the invention or sacrificing the advantages thereof.

I claim:

1. The process of producing organic carbonyl compounds which comprises acting with carbon monoxide and hydrogen in the presence of a hydrogenation catalyst at a temperature ranging between about 40° and 200° C. and under a pressure ranging between about 20 and 300 atmospheres on an organic substance selected from the group which consists of the aliphatic and cyclic olefines.

2. The process of claim 1, in which at least one metal of the eighth group of the periodic system is used as hydrogenation catalyst.

3. The process of claim 1, in which a mixture of at least one metal of the eighth group of the periodic system with a metal oxide activator is used as hydrogenation catalyst.

4. The process of claim 1, in which a mixture of a hydrogenation cobalt catalyst with a metal oxide activator is used as catalyst.

5. The process of claim 1, in which the starting compound is oil of turpentine and a mixture of a hydrogenation cobalt catalyst with a metal oxide activator is used as catalyst.

6. The process of producing organic carbonyl compounds which comprises passing a gaseous mixture of carbon monoxide, hydrogen and an organic substance selected from the group consisting of the aliphatic and cyclic olefines at a temperature ranging between about 40° and 200° C. and under a pressure ranging between about 20 and 300 atmospheres into contact with a hydrogenation catalyst, separating the compounds formed in the reaction and returning the remaining mixture into contact with the catalyst.

7. The process of producing organic carbonyl compounds which comprises passing a gaseous mixture of carbon monoxide, hydrogen and an organic substance selected from the group which consists of aliphatic and cyclic olefines, at a temperature ranging between about 40° and 200° C. and under a pressure ranging between about 20 and 300 atmospheres into contact with a hydrogenation catalyst suspended in an inert liquid.

8. The process of claim 7, in which the inert liquid contains an olefine.

OTTO ROELEN.